(12) United States Patent
Ikeda et al.

(10) Patent No.: US 10,239,020 B2
(45) Date of Patent: *Mar. 26, 2019

(54) WATER TREATMENT SYSTEM AND WATER TREATMENT METHOD

(71) Applicant: SUMITOMO ELECTRIC INDUSTRIES, LTD., Osaka-shi, Osaka (JP)

(72) Inventors: Keiichi Ikeda, Osaka (JP); Hideki Kashihara, Osaka (JP)

(73) Assignee: SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 25 days.

This patent is subject to a terminal disclaimer.

(21) Appl. No.: 15/547,814

(22) PCT Filed: Jan. 9, 2016

(86) PCT No.: PCT/JP2016/050587
§ 371 (c)(1),
(2) Date: Aug. 1, 2017

(87) PCT Pub. No.: WO2016/129308
PCT Pub. Date: Aug. 18, 2016

(65) Prior Publication Data
US 2018/0028980 A1 Feb. 1, 2018

(30) Foreign Application Priority Data
Feb. 9, 2015 (JP) ................. 2015-023570

(51) Int. Cl.
*C02F 1/44* (2006.01)
*B01D 65/00* (2006.01)
(Continued)

(52) U.S. Cl.
CPC ........... *B01D 65/003* (2013.01); *B01D 65/08* (2013.01); *B01F 3/04* (2013.01); *B01F 5/04* (2013.01);
(Continued)

(58) Field of Classification Search
CPC .... C02F 1/44; C02F 2101/32; C02F 2103/10; C02F 3/1268; C02F 3/1273; C02F 3/282;
(Continued)

(56) References Cited

U.S. PATENT DOCUMENTS 3,693,915 A * 9/1972 Ulanovsky ............. B64D 37/32
244/135 R
5,904,190 A * 5/1999 Patel ........................ A62C 3/06
141/198

(Continued)

FOREIGN PATENT DOCUMENTS

| JP | 2009-148673 A | 7/2009 |
| JP | 201261459 * | 3/2012 |
| JP | 2016-34607 A | 3/2016 |

OTHER PUBLICATIONS

U.S. Notice of Allowance dated Jun. 28, 2018 that issued in related U.S. Appl. No. 15/318,463.

*Primary Examiner* — Pranav N Patel
(74) *Attorney, Agent, or Firm* — Drinker Biddle & Reath LLP (57) ABSTRACT

A water treatment system according to an embodiment of the present invention includes a tank that stores water to be treated, a crossflow filtration membrane module that filters the water to be treated, a supply passage through which the water to be treated is supplied from the tank to the filtration membrane module by using a supply pump, and a recirculation passage through which the water to be treated, the water having passed through a membrane upstream side of the filtration membrane module, is recirculated to the tank.

(Continued)

The tank has an upper space above a liquid surface of the stored water to be treated, the upper space being hermetically filled with an inert gas. The water treatment system further includes a gas transport passage through which the inert gas is introduced from the upper space into the supply passage or the filtration membrane module, and a compressor that is disposed in the gas transport passage and that pressurizes the inert gas. The compressor is preferably a water-sealed compressor.

9 Claims, 1 Drawing Sheet (51) Int. Cl.
| | | |
|---|---|---|
| | *B01F 3/04* | (2006.01) |
| | *B01F 5/04* | (2006.01) |
| | *B01D 65/08* | (2006.01) |
| | B01D 65/04 | (2006.01) |
| | C02F 101/32 | (2006.01) |

(52) U.S. Cl.
CPC ............ *C02F 1/44* (2013.01); *C02F 1/444* (2013.01); *B01D 65/04* (2013.01); *B01D 2311/165* (2013.01); *B01D 2311/25* (2013.01); *B01D 2313/10* (2013.01); *B01D 2313/26* (2013.01); *B01D 2321/04* (2013.01); *C02F 2101/32* (2013.01)

(58) Field of Classification Search
CPC .. C02F 3/2853; C02F 3/2893; B01D 2311/04; B01D 2321/185; B01D 2315/06
See application file for complete search history.

(56) References Cited

U.S. PATENT DOCUMENTS

| | | | |
|---|---|---|---|
| 10,065,153 B2 | 9/2018 | Kashihara | |
| 2007/0051679 A1* | 3/2007 | Adams .................. | B01D 61/18 210/636 |
| 2010/0230366 A1* | 9/2010 | Bigeonneau ....... | B01D 19/0031 210/750 |
| 2010/0237014 A1* | 9/2010 | Pedersen ................ | B01D 61/18 210/650 |
| 2012/0043264 A1* | 2/2012 | Isogami ............ | B01D 21/0009 210/96.1 |

* cited by examiner

WATER TREATMENT SYSTEM AND WATER TREATMENT METHOD

TECHNICAL FIELD

The present invention relates to a water treatment system and a water treatment method.

BACKGROUND ART

Water treatment systems configured to remove oil and suspended solids from water to be treated, the water containing oil and suspended solids, by using filtration membranes are known. In such water treatment systems, by configuring the systems such that water to be treated is supplied from one end side of filtration membranes in a direction parallel to the membrane surfaces and discharged from the other end side of the filtration membranes, that is, crossflow filtration is performed, clogging of the filtration membranes can be reduced even in the case of treating water to be treated, the water containing large amounts of oil and suspended solids, such as oilfield-produced water.

In addition, by mixing a gas with water to be treated, clogging of filtration membranes can be suppressed by the scrubbing effect of gas bubbles. As a method for mixing a gas with water to be treated, there has been proposed a method using an aspirator (also referred to as an ejector) that produces a negative pressure by means of the Venturi effect due to constriction of a passage of water to be treated and that aspirates a gas into the water to be treated (refer to Japanese Unexamined Patent Application Publication No. 2009-148673).

CITATION LIST

Patent Literature

PTL 1: Japanese Unexamined Patent Application Publication No. 2009-148673

SUMMARY OF INVENTION

Technical Problem

In the water treatment system disclosed in the patent application publication described above, a gas is introduced into water to be treated by aspiration of air by the aspirator. However, water to be treated may generate a flammable gas as a result of decomposition of organic substances contained in the water, or a flammable gas dissolved in water to be treated may be gasified by a pressure change. When air is introduced into such water to be treated, there is a concern that a flammable gas may explode inside a filtration membrane module. Therefore, the water treatment system of the above patent application publication may not be applied to water to be treated, the water being capable of generating a flammable gas.

The present invention has been made under the circumstances described above. An object of the present invention is to provide a water treatment system and a water treatment method in which explosions can be prevented even when water to be treated, the water being capable of generating a flammable gas, is filtered.

Solution to Problem

A water treatment system according to an embodiment of the present invention, which has been made to solve the problem described above, includes a tank that stores water to be treated, a crossflow filtration membrane module that filters the water to be treated, a supply passage through which the water to be treated is supplied from the tank to the filtration membrane module by using a supply pump, and a recirculation passage through which the water to be treated, the water having passed through a membrane upstream side of the filtration membrane module, is recirculated to the tank. The tank has an upper space above a liquid surface of the stored water to be treated, the upper space being hermetically filled with an inert gas. The water treatment system further includes a gas transport passage through which the inert gas is introduced from the upper space into the supply passage or the filtration membrane module, and a compressor that is disposed in the gas transport passage and that pressurizes the inert gas.

A water treatment method according to an embodiment of the present invention, which has been made to solve the problem described above, includes a step of supplying water to be treated, through a supply passage, from a tank that stores the water to be treated to a crossflow filtration membrane module, and a step of recirculating the water to be treated, the water having passed through a membrane upstream side of the filtration membrane module, to the tank. In the water treatment method, the tank has an upper space above a liquid surface of the stored water to be treated, the upper space being hermetically filled with an inert gas. The water treatment method further includes a step of pressurizing the inert gas in the upper space by a compressor to introduce the inert gas into the supply passage or the filtration membrane module.

Advantageous Effects of Invention

In the water treatment system according to an embodiment of the present invention, explosions can be prevented even when water to be treated, the water being capable of generating a flammable gas, is filtered.

REFERENCE SIGNS LIST 1 water-to-be-treated storage tank 2 filtration membrane module 3 filtered water storage tank
4 supply passage 5 recirculation passage 6 gas transport passage 7 treated water passage 8 backwash water passage
9 raw water passage 10 water discharge passage 11 inert gas supply unit 12 suspended matter discharge passage
13 sediment discharge passage 14 filtration tank 15 hollow-fiber membrane
16 upper holding member 17 lower holding member 17a outer frame 17b fixing portion
18 supply pump 19 aspirator 20 discharge valve 21 compressor
22 gas-liquid separator 23 seal water return passage 24 cooling device
25 on-off valve 26 suction pump 27 backwash pump
28 on-off valve 29 ball tap 30 gas cylinder 31 supply valve
32 gas supply passage 33 on-off valve 34 on-off valve

DESCRIPTION OF EMBODIMENTS

[Description of Embodiments of the Present Invention]

A water treatment system according to an embodiment of the present invention includes a tank that stores water to be treated, a crossflow filtration membrane module that filters the water to be treated, a supply passage through which the water to be treated is supplied from the tank to the filtration membrane module by using a supply pump, and a recirculation passage through which the water to be treated, the water having passed through a membrane upstream side of the filtration membrane module, is recirculated to the tank. The tank has an upper space above a liquid surface of the stored water to be treated, the upper space being hermetically filled with an inert gas. The water treatment system further includes a gas transport passage through which the inert gas is introduced from the upper space into the supply passage or the filtration membrane module, and a compressor that is disposed in the gas transport passage and that pressurizes the inert gas.

In the water treatment system, the tank has an upper space above a liquid surface of the stored water to be treated, the upper space being hermetically filled with an inert gas. The gas transport passage through which the inert gas is introduced from the upper space into the supply passage or the filtration membrane module is provided with a compressor that pressurizes the inert gas. Accordingly, gas bubbles of the inert gas are supplied to the filtration membrane module, and clogging of filtration membranes can be suppressed by the scrubbing effect of the gas bubbles. Furthermore, in the water treatment system, since the space above the liquid surface of the water to be treated, the water being stored in the tank, is hermetically filled with the inert gas, gaseous oxygen can be eliminated from a closed system through which the water to be treated is circulated between the tank and the filtration membrane module. Therefore, according to the water treatment system, even if flammable gas is generated from water to be treated, explosions can be prevented by maintaining a low oxygen concentration in the gas.

The compressor is preferably a water-sealed compressor. A water-sealed compressor serving as the compressor unlikely causes a problem of the device even if the inert gas suctioned from the upper space contains water, because the water becomes part of seal water of the water-sealed compressor. Therefore, in the water treatment system, the inert gas is stably supplied to the filtration membrane module, to thereby prevent clogging of filtration membranes more reliably, and thus the water treatment can be performed continuously and stably.

The water treatment system preferably further includes a gas-liquid separator on a discharge side of the water-sealed compressor in the gas transport passage, and a seal water return passage that communicates from the gas-liquid separator to the water-sealed compressor. As a result, seal water leaked out from the water-sealed compressor together with the inert gas can be collected by the gas-liquid separator and recirculated to the water-sealed compressor. Therefore, sealing defects of the water-sealed compressor can be prevented to continuously perform the water treatment.

The water treatment system preferably includes a cooling device that is disposed in the seal water return passage and that cools water separated by the gas-liquid separator. When the water treatment system includes a cooling device that is disposed in the seal water return passage and that cools water separated by the gas-liquid separator, an increase in the temperature of the water-sealed compressor is suppressed, and the compression efficiency of the inert gas can be maintained.

Filtered water of the filtration membrane module is preferably used as seal water of the water-sealed compressor. In the case where the water treatment system uses filtered water of the filtration membrane module as seal water of the water-sealed compressor, it is not necessary to supply clean water, and extra piping or the like is not required. Accordingly, the equipment cost and the operation cost of the water treatment system can be reduced.

The inert gas is preferably introduced into the supply passage through the gas transport passage, and a flow velocity of the water to be treated is preferably 2.5 m/s or more and 15.0 m/s or less at a point where the inert gas is introduced into the supply passage. When the inert gas is introduced into the supply passage through the gas transport passage and a flow velocity of the water to be treated is within this range at a point where the inert gas is introduced into the supply passage, gas bubbles of the inert gas can be supplied to the filtration membrane module even at a low discharge pressure of the compressor. Accordingly, in the water treatment system, the equipment cost is reduced, and the operation cost can also be reduced.

The gas transport passage is preferably connected to the supply passage, and an aspirator that mixes the inert gas with the water to be treated is preferably disposed at a portion where the gas transport passage is connected to the supply passage. In the case where the gas transport passage is connected to the supply passage, and an aspirator that mixes the inert gas with the water to be treated is disposed at a portion where the gas transport passage is connected to the supply passage, the compressor of the water treatment system may have a low discharge pressure, and thus the equipment cost can be reduced.

The water treatment system preferably includes a suction pump in a passage through which filtered water is discharged from the filtration membrane module. When a suction pump is provided in a passage through which filtered water is discharged from the filtration membrane module, stable filtration can be performed.

A water treatment method according to an embodiment of the present invention includes a step of supplying water to be treated, through a supply passage, from a tank that stores the water to be treated to a crossflow filtration membrane module, and a step of recirculating the water to be treated, the water having passed through a membrane upstream side of the filtration membrane module, to the tank. In the water treatment method, the tank has an upper space above a liquid surface of the stored water to be treated, the upper space being hermetically filled with an inert gas. The water treatment method further includes a step of pressurizing the inert gas in the upper space by a compressor to introduce the inert gas into the supply passage or the filtration membrane module.

In the water treatment method, the tank has an upper space above a liquid surface of the stored water to be treated, the upper space being hermetically filled with an inert gas, a gas transport passage through which the inert gas is introduced from the upper space into the supply passage or the filtration membrane module is further provided, and the inert gas in the upper space is pressurized by a compressor to introduce the inert gas into the supply passage or the filtration membrane module. As a result, gas bubbles of the inert gas are supplied to the filtration membrane module, and clogging of filtration membranes can be suppressed by the scrubbing effect of the gas bubbles. Furthermore, in the water treatment method, since the space above the liquid surface of the water to be treated, the water being stored in the tank, is hermetically filled with the inert gas, gaseous oxygen can be eliminated from a closed system through which the water to be treated is circulated between the tank and the filtration membrane module. Therefore, according to the water treatment method, even if flammable gas is generated from water to be treated, explosions can be prevented by maintaining a low oxygen concentration in the gas.

Herein, the term "membrane upstream side" refers to a side on which a filtration membrane comes in contact with water to be treated, and the term membrane downstream side refers to a side on which a filtration membrane comes in contact with filtered water. The term "inert gas" refers to a gas having no combustibility or explosiveness even when the gas comes in contact with volatile components in oil, and specifically, a gas having an oxygen volume content of 10% or less, and preferably 1% or less.

[Detailed Description of Embodiments of the Present Invention]

Embodiments of the water treatment system according to the present invention will be described in detail with reference to the drawing.

Figure 1:
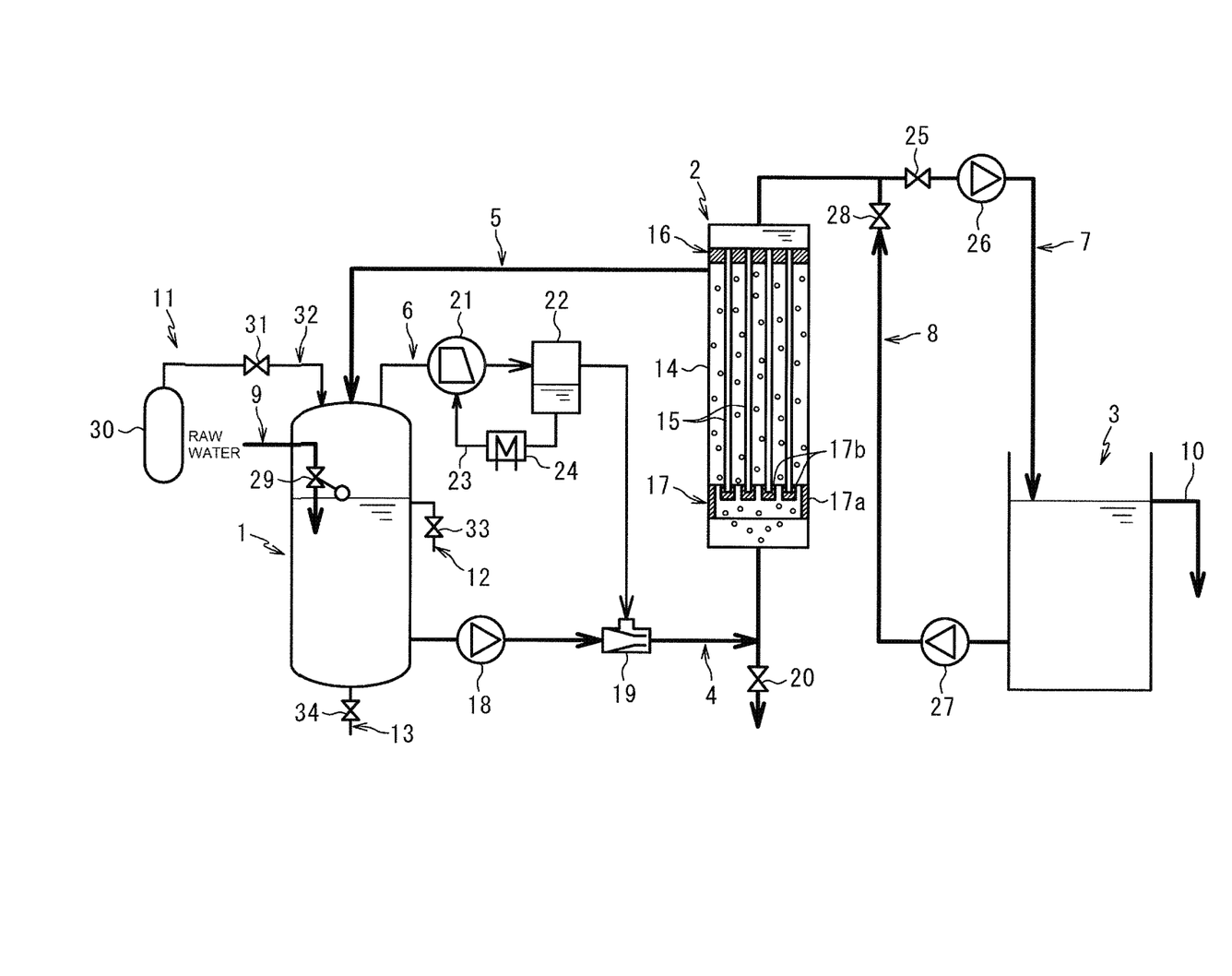
FIG. 1 is a schematic diagram illustrating a structure of a water treatment system according to an embodiment of the present invention.

A water treatment system illustrated in FIG. 1 is a system configured to remove oil and suspended solids from water to be treated, the water containing oil and suspended solids. Examples of the water to be treated by the water treatment system include oilfield-produced water produced in oilfields and the like. Water that is preliminarily treated with a sand filter or the like may be used as the water to be treated.

The water treatment system illustrated in FIG. 1 mainly includes a water-to-be-treated storage tank 1 that stores water to be treated, the water containing oil and suspended solids, and has an upper space above the liquid surface of the water to be treated, the upper space being hermetically filled with an inert gas, a filtration membrane module 2 that filters the water to be treated in a crossflow manner, and a filtered water storage tank 3 that stores filtered water (treated water) filtered by the filtration membrane module 2.

The water treatment system further includes a supply passage 4 through which the water to be treated is supplied from the water-to-be-treated storage tank 1 to the filtration membrane module 2, a recirculation passage 5 through which the water to be treated, the water having passed through the membrane upstream side of the filtration membrane module 2, is recirculated to the water-to-be-treated storage tank 1, a gas transport passage 6 through which an inert gas is introduced from the upper space of the water-to-be-treated storage tank 1 into the supply passage 4, a treated water passage 7 through which filtered water is fed from the filtration membrane module 2 to the filtered water storage tank 3, and a backwash water passage 8 through which the filtered water is pressure-fed from the filtered water storage tank 3 to the treated water passage 7, and to the filtration membrane module 2.

The water treatment system further includes a raw water passage 9 through which water to be treated (hereinafter, may be referred to as raw water) is newly supplied from a raw water tank or the like (not illustrated) to the water-to-be-treated storage tank 1, a water discharge passage 10 for overflowing and discharging filtered water from the filtered water storage tank 3, an inert gas supply unit 11 configured to introduce an inert gas into the water-to-be-treated storage tank 1, a suspended matter discharge passage 12 through which suspended matter in the water to be treated inside the water-to-be-treated storage tank 1 is discharged, and a sediment discharge passage 13 through which sediments in the water to be treated inside the water-to-be-treated storage tank 1 are discharged.

<Water-to-be-treated Storage Tank>

The water-to-be-treated storage tank 1 is an airtight container. The water-to-be-treated storage tank 1 is formed by using a metal or resin so as to have a strength that can withstand the internal pressure. In particular, from the viewpoint of strength, heat resistance, chemical resistance, and the like, the material for forming the water-to-be-treated storage tank 1 is preferably stainless steel, polypropylene, or an acrylonitrile-butadiene-styrene copolymer (ABS resin). The water-to-be-treated storage tank 1 may be provided, on the outer side thereof, with a reinforcing member, a leg member for self-support, and the like.

The supply passage 4 is connected to the side wall of the water-to-be-treated storage tank 1 at a position apart from the bottom of the water-to-be-treated storage tank 1 so as to prevent sediments in the water-to-be-treated storage tank 1 from flowing out. The recirculation passage 5 and the gas transport passage 6 are connected to an upper portion of the water-to-be-treated storage tank 1, for example, to the top wall of the water-to-be-treated storage tank 1. The suspended matter discharge passage 12 is connected to the side wall of the water-to-be-treated storage tank 1 at a position near the liquid surface of the stored water to be treated. The sediment discharge passage 13 is connected to the bottom of the water-to-be-treated storage tank 1.

The amount of water stored in the water-to-be-treated storage tank 1 is appropriately selected depending on, for example, the amount of raw water to be treated, and the contents of oil and suspended solids. For example, when the amount of water to be treated, the water being supplied from the supply passage 4 to the filtration membrane module 2, is 240 L/hr and the amount of filtered water flowing from the filtration membrane module 2 to the treated water passage 7 is 80 L/hr, the amount of water stored in the water-to-be-treated storage tank 1 may be 30 L or more and to 200 L or less.

The water-to-be-treated storage tank 1 has an upper space above the liquid surface of the stored water to be treated, the upper space being hermetically filled with an inert gas. The lower limit of the ratio of the volume of the upper space to the total internal volume of the water-to-be-treated storage tank 1 is preferably 1/4 , and more preferably 1/3. The upper limit of the ratio of the volume of the upper space to the total internal volume of the water-to-be-treated storage tank 1 is preferably 2/3, and more preferably 1/2. When the ratio of the volume of the upper space to the total internal volume of the water-to-be-treated storage tank 1 is less than the lower limit, it may not be possible to enclose a sufficient amount of inert gas in the system, water to be treated may flow into the gas transport passage 6, and it may not be possible to supply the inert gas stably to the supply passage 4. On the other hand, when the ratio of the volume of the upper space to the total internal volume of the water-to-be-treated storage tank 1 is more than the upper limit, the size of the water-to-be-treated storage tank 1 may be increased unnecessarily.

<Filtration Membrane Module>

The filtration membrane module 2 includes an airtight filtration tank 14 to be filled with water to be treated, a plurality of hollow-fiber membranes (filtration membranes) 15 disposed inside the filtration tank 14 and held in a state of being arranged in parallel in the upward-downward direction, an upper holding member 16 that fixes the upper ends of the hollow-fiber membranes 15, and a lower holding member 17 that fixes the lower ends of the hollow-fiber membranes 15.

(Filtration Tank)

The filtration tank 14 is a container capable of storing a liquid therein in a pressurized state in which a membrane-upstream-side pressure is higher than the atmospheric pressure. The filtration tank 14 is usually installed in a standing manner and is an airtight tubular body whose both ends are sealed. The planar shape of the filtration tank 14 is not particularly limited and may be, for example, circular or polygonal. Furthermore, the hollow-fiber membranes 15 are disposed inside the filtration tank 14 so as to be arranged in parallel in the same direction as the axial direction of the filtration tank 14.

The filtration tank 14 is formed by using a metal or resin so as to have a strength that can withstand the pressure of water to be treated. In particular, from the viewpoint of strength, heat resistance, chemical resistance, and the like, the material of the filtration tank 14 is preferably stainless steel, polypropylene, or an acrylonitrile-butadiene-styrene copolymer (ABS resin). The filtration tank 14 may be provided, on the outer side thereof, with a reinforcing member, a leg member for self-support, and the like.

The supply passage 4 is connected to the lower end of the filtration tank 14, that is, to one end side in the direction in which the hollow-fiber membranes 15 are arranged in parallel in the filtration tank 14. The recirculation passage 5 is connected to the other end side in the direction in which the hollow-fiber membranes are arranged in parallel in the filtration tank 14, more specifically, to the side wall at a position slightly below the upper holding member 16. With this structure, a closed system through which water to be treated is circulated between the water-to-be-treated storage tank 1 and the filtration membrane module 2 is formed. The treated water passage 7 is connected to the upper end of the filtration tank 14.

More specifically, in the filtration membrane module 2, water to be treated, the water containing gas bubbles of an inert gas, is introduced in a pressurized state into a portion lower than the lower ends of the hollow-fiber membranes 15. The water to be treated, the water having been supplied into the filtration tank 14, rises along outer surfaces of the hollow-fiber membranes 15 together with the gas bubbles of the inert gas, and is discharged from the recirculation passage 5 disposed on the upper end side of the hollow-fiber membranes 15. Furthermore, part of the water to be treated passes from the membrane upstream side to the membrane downstream side of the hollow-fiber membranes 15 to become filtered water and is discharged into the treated water passage 7.

The membrane-upstream-side pressure of the filtration tank 14 during steady operation is, for example, 10 kPa or more and 200 kPa or less in terms of gauge pressure. The membrane-upstream-side pressure of the filtration tank 14 can be adjusted by the output of a supply pump 18 and the pressure of the inert gas introduced into the water-to-be-treated storage tank 1. In order to obtain the membrane-upstream-side pressure of the filtration tank 14, for example, a throttle valve or an orifice may be arranged in the recirculation passage 5. The "membrane-upstream-side pressure" of the filtration tank 14 means the average of the pressure at the upper surface of the lower holding member 17, that is, the lower end of an exposed region of the hollow-fiber membranes 15, and the pressure at the lower surface of the upper holding member 16, that is, the upper end of the exposed region of the hollow-fiber membranes.

(Hollow-fiber Membrane)

The hollow-fiber membranes 15 are each formed of a microfiltration membrane or an ultrafiltration membrane having a cylindrical or a tubular shape, and are each a filtration membrane that allows water to pass through a hollow portion inside thereof and that prevents permeation of oil droplets and particulate suspended solids contained in water to be treated.

Each of the hollow-fiber membranes 15 includes a cylindrical support layer and a filtration layer disposed on a surface of the support layer. Such a hollow-fiber membrane 15 having a multilayer structure enables both water permeability and mechanical strength to be realized and enables the effect of surface cleaning with gas bubbles to be enhanced.

The support layer and the filtration layer are each preferably formed of a material containing polytetrafluoroethylene (PTFE) as a main component. When the main component of the material for forming each of the support layer and the filtration layer is PTFE, the hollow-fiber membranes 15 exhibit good mechanical strength, the amount of deflection can be reduced even when the aspect ratio, which is the ratio of the average length to the average outer diameter of the hollow-fiber membranes, is high, and the surfaces of the hollow-fiber membranes are unlikely to suffer, for example, damage from scrubbing with gas bubbles. The material of each of the support layer and the filtration layer may optionally contain, for example, other polymers and additives. The term "main component" refers to a component whose mass content is the highest, and preferably a component having a mass content of 50% or more, and more preferably 90% or more.

The lower limit of the number-average molecular weight of PTFE of each of the support layer and the filtration layer is preferably 500000, and more preferably 2000000. The upper limit of the number-average molecular weight of PTFE of each of the support layer and the filtration layer is preferably 20000000. When the number-average molecular weight of PTFE is less than the lower limit, the surfaces of the hollow-fiber membranes 15 may be damaged by scrubbing with gas bubbles, or the mechanical strength of the hollow-fiber membranes 15 may become insufficient. On the other hand, when the number-average molecular weight of PTFE is more than the upper limit, it may become difficult to form pores of the hollow-fiber membranes 15.

The support layer may be, for example, a tube obtained by extrusion of PTFE. When such an extruded tube is used as the support layer, the support layer exhibits mechanical strength, and pores can be easily foamed. The tube is preferably expanded at an expansion ratio of 50% or more and 700% or less in the axial direction and at an expansion ratio of 5% or more and 100% or less in the circumferential direction.

The temperature for expansion is preferably equal to or lower than the melting point of the tube material, for example, 0° C. or higher and 300° C. or lower. In order to obtain a porous body having a relatively large pore diameter, expansion is preferably performed at a low temperature. In order to obtain a porous body having a relatively small pore diameter, expansion is preferably performed at a high temperature. The expanded porous body is heat-treated at a temperature of 200° C. or higher and 300° C. or lower for about 1 to 30 minutes while both ends are fixed to maintain the expanded state, and consequently, high dimensional stability is obtained. The size of pores of the porous body can be adjusted by combining the conditions such as the expanding temperature and the expansion ratio.

The tube forming the support layer can be obtained by, for example, blending a liquid lubricant such as naphtha with a PTFE fine powder, forming the resulting mixture into a tube by extrusion or the like, and then expanding the tube. Dimensional stability can be enhanced by holding the tube at a temperature equal to or higher than the melting point of the PTFE fine powder, for example, at 350° C. or higher and 550° C. or lower in a heating furnace for about several tens of seconds to several minutes to perform sintering.

The average thickness of the support layer is preferably 0.1 mm or more and 3 mm or less. When the average thickness of the support layer is within this range, mechanical strength and water permeability can be imparted to the hollow-fiber membrane 15 in a balanced manner.

The filtration layer can be formed by, for example, wrapping a PTFE sheet around the support layer and perform sintering. When a sheet is used as the material for forming the filtration layer, expansion can be facilitated, the shape and size of pores are easily adjusted, and the thickness of the filtration layer can be reduced. Since the sheet is wrapped around and sintered, the support layer and the filtration layer are combined to form a single membrane and the pores in the two layers can be caused to connect to one another to improve permeability. The sintering temperature is preferably equal to or higher than the melting point of each of the tube forming the support layer and the sheet forming the filtration layer.

The sheet forming the filtration layer can be produced by, for example, (1) a method in which an unsintered molded body obtained by extrusion of a resin is expanded at a temperature equal to or lower than the melting point, and sintering is then performed, or (2) a method in which a sintered resin molded body is slowly cooled to enhance crystallinity, and the resulting molded body is then expanded. Preferably, the sheet is expanded at an expansion ratio of 50% or more and 1000% or less in the longitudinal direction and at an expansion ratio of 50% or more and 2500% or less in the lateral direction. In particular, when the expansion ratio in the lateral direction is within this range, mechanical strength in the circumferential direction as the sheet is wrapped around can be improved, and durability to withstand surface cleaning with gas bubbles can be improved.

When the filtration layer is formed by wrapping a sheet around the tube that forms the support layer, fine irregularities are preferably formed on the outer circumferential surface of the tube. When irregularities are formed on the outer circumferential surface of the tube, misalignment with the sheet can be prevented, and adhesion between the tube and the sheet is improved to thereby prevent the filtration layer from being detached from the support layer due to cleaning with gas bubbles. The number of times the sheet is wrapped around can be adjusted depending on the thickness of the sheet. The number of times may be one or more than one. A plurality of sheets may be wrapped around the tube. The method for wrapping the sheet is not particularly limited, and the sheet may be wrapped in the circumferential direction of the tube or may be spirally wrapped.

The size (difference in height) of the fine irregularities is preferably 20 μm or more and 200 μm or less. The fine irregularities are preferably formed over the entire outer circumferential surface of the tube, but may be formed partially or discontinuously. Examples of the method for forming the fine irregularities on the outer circumferential surface of the tube include surface treatment by flames, laser irradiation, plasma irradiation, and dispersion coating of a fluororesin or the like. Surface treatment by flames is preferable since irregularities can be easily formed without affecting tube properties.

Alternatively, an unsintered tube and an unsintered sheet may be used, and after the sheet is wrapped around the tube, sintering may be performed so as to enhance adhesion between the tube and the sheet.

The average thickness of the filtration layer is preferably 5 μm or more and 100 μm or less. When the average thickness of the filtration layer is within this range, high filtration performance can be imparted to the hollow-fiber membranes 15 easily and reliably.

The lower limit of the average outer diameter of the hollow-fiber membranes 15 is preferably 2 mm, and more preferably 2.1 mm. The upper limit of the average outer diameter of the hollow-fiber membranes 15 is preferably 6 mm, and more preferably 4 mm. When the average outer diameter of the hollow-fiber membranes 15 is less than the lower limit, mechanical strength of the hollow-fiber membranes 15 may become insufficient. On the other hand, when the average outer diameter of the hollow-fiber membranes 15 is more than the upper limit, the ratio of the surface area to the sectional area of the hollow-fiber membranes 15 is decreased, and filtration efficiency may become insufficient and the surface area scrubbed with one gas bubble may be decreased.

The lower limit of the average inner diameter of the hollow-fiber membranes 15 is preferably 0.5 mm, and more preferably 0.9 mm. The upper limit of the average inner diameter of the hollow-fiber membranes 15 is preferably 4 mm, and more preferably 3 mm. When the average inner diameter of the hollow-fiber membranes 15 is less than the lower limit, pressure drop may increase at the time of discharging of the filtered water inside the hollow-fiber membranes 15. On the other hand, when the average inner diameter of the hollow-fiber membranes 15 is more than the upper limit, the thickness of the hollow-fiber membranes 15 is decreased, and mechanical strength and the effect of preventing peimeation of impurities may become insufficient.

The lower limit of the ratio of the average inner diameter to the average outer diameter of the hollow-fiber membranes 15 is preferably 0.3, and more preferably 0.4. The upper limit of the ratio of the average inner diameter to the average outer diameter of the hollow-fiber membranes 15 is preferably 0.8, and more preferably 0.6. When the ratio of the average inner diameter to the average outer diameter of the hollow-fiber membranes 15 is less than the lower limit, the thickness of the hollow-fiber membranes 15 increases more than necessary, and water permeability of the hollow-fiber membranes 15 may become insufficient. On the other hand, when the ratio of the average inner diameter to the average outer diameter of the hollow-fiber membranes 15 is more than the upper limit, the thickness of the hollow-fiber membranes 15 decreases, and mechanical strength and the effect of preventing permeation of impurities may become insufficient.

The lower limit of the average length of the hollow-fiber membranes 15 is preferably 1 m, and more preferably 1.5 m. The upper limit of the average length of the hollow-fiber membranes 15 is preferably 5 m, and more preferably 4 m. When the average length of the hollow-fiber membranes 15 is less than the lower limit, the surface area of the hollow-fiber membranes 15 scrubbed with one gas bubble during the period in which the gas bubble is supplied from below the filtration membrane module 2 and rises to the water surface decreases, and efficiency of cleaning the hollow-fiber membranes 15 may become insufficient. On the other hand, when the average length of the hollow-fiber membranes 15 is more than the upper limit, deflection of the hollow-fiber membranes 15 may be increased excessively by the own weight of the hollow-fiber membranes 15, and handleability may become insufficient during, for example, installation of the filtration membrane module 2. Note that the average length of the hollow-fiber membranes 15 refers to the average length of an exposed region of the hollow-fiber membranes 15 between the upper holding member 16 and the lower holding member 17, that is, the average distance from the lower surface of the upper holding member 16 to the upper surface of the lower holding member 17.

The lower limit of the ratio of the average length to the average outer diameter (aspect ratio) of the hollow-fiber membranes 15 is preferably 200, and more preferably 400. The upper limit of the aspect ratio of the hollow-fiber membranes 15 is preferably 3000, and more preferably 2500. When the aspect ratio of the hollow-fiber membranes 15 is less than the lower limit, the surface area of the hollow-fiber membranes 15 that can be scrubbed with one gas bubble decreases, and thus efficiency of cleaning the hollow-fiber membranes 15 may become insufficient. On the other hand, when the aspect ratio of the hollow-fiber membranes 15 is more than the upper limit, the hollow-fiber membranes 15 are excessively elongated, and thus mechanical strength may become insufficient when the hollow-fiber membranes 15 are stretched in the upward-downward direction.

The lower limit of the porosity of the hollow-fiber membrane 15 is preferably 75%, and more preferably 78%. The upper limit of the porosity of the hollow-fiber membrane 15 is preferably 90%, and more preferably 85%. When the porosity of the hollow-fiber membrane 15 is less than the lower limit, water permeability decreases, and the filtration ability of the filtration membrane module 2 may become insufficient. On the other hand, when the porosity of the hollow-fiber membrane 15 is more than the upper limit, mechanical strength and resistance to scrubbing of the hollow-fiber membrane 15 may become insufficient. Note that the porosity refers to the ratio of the total volume of pores to the volume of the hollow-fiber membrane 15 and can be determined by measuring the density of the hollow-fiber membrane 15 in accordance with ASTM-D-792.

The lower limit of the area occupying ratio of the pores in the hollow-fiber membrane 15 is preferably 40%. The upper limit of the area occupying ratio of the pores in the hollow-fiber membrane 15 is preferably 60%. When the area occupying ratio of the pores is less than the lower limit, water permeability decreases, and the filtration ability of the filtration membrane module 2 may become insufficient. On the other hand, when the area occupying ratio of the pores is more than the upper limit, the surface strength of the hollow-fiber membrane 15 becomes insufficient, and, for example, the hollow-fiber membrane 15 may be damaged by scrubbing with gas bubbles. Note that the area occupying ratio of the pores refers to the ratio of the total area of pores in the outer circumferential surface (surface of the filtration layer) of the hollow-fiber membrane 15 to the surface area of the hollow-fiber membrane 15 and can be determined by analyzing an electron micrograph of the outer circumferential surface of the hollow-fiber membrane 15.

The lower limit of the mean pore diameter of the hollow-fiber membrane 15 is preferably 0.01 µm. The upper limit of the mean pore diameter of the hollow-fiber membrane 15 is preferably 0.45 µm, and more preferably 0.1 µm. When the mean pore diameter of the hollow-fiber membrane 15 is less than the lower limit, water permeability may become insufficient. On the other hand, when the mean pore diameter of the hollow-fiber membrane 15 is more than the upper limit, it may not be possible to prevent impurities contained in water to be treated from permeating into the hollow-fiber membrane 15. Note that the mean pore diameter refers to the mean diameter of pores on the outer circumferential surface (surface of the filtration layer) of the hollow-fiber membrane 15 and can be measured by a pore size distribution analyzer (for example, "porous material automatic pore size distribution measuring system", available from Porous Materials, Inc.).

The lower limit of the tensile strength of the hollow-fiber membrane 15 is preferably 50 N, and more preferably 60 N. When the tensile strength of the hollow-fiber membrane 15 is less than the lower limit, durability to withstand surface cleaning with gas bubbles may become insufficient. Although the upper limit of the tensile strength of the hollow-fiber membrane 15 is not particularly limited, the maximum value of the tensile strength of a hollow-fiber membrane that can be produced with the current technology is about 150 N. Note that the "tensile strength" means the maximum tensile stress obtained when a tensile test is performed in accordance with JIS-K7161 (1994) at a gauge length of 100 mm and a testing speed of 100 mm/min.

The lower limit of the density (N/A) of the hollow-fiber membranes 15, which is determined by dividing the number N of hollow-fiber membranes 15 held by the lower holding member 17 by the area A of the region in which the hollow-fiber membranes 15 are arranged, is preferably 4 membranes/cm$^2$, and more preferably 6 membranes/cm$^2$. The upper limit of the density of the hollow-fiber membranes 15 is preferably 15 membranes/cm$^2$, and more preferably 12 membranes/cm$^2$. When the density of the hollow-fiber membranes 15 is less than the lower limit, the filtration efficiency per unit volume of the filtration membrane module 2 may become insufficient. On the other hand, when the density of the hollow-fiber membranes 15 is more than the upper limit, the distance between the hollow-fiber membranes 15 is decreased, and it may not be possible to clean the surfaces satisfactorily. The term "region in which hollow-fiber membranes are arranged" refers to an imaginary polygon having the smallest area among the imaginary polygons including all the hollow-fiber membranes 15 in the filtration membrane module 2 when viewed in the axial direction of the hollow-fiber membranes.

Furthermore, assuming that the hollow-fiber membranes 15 are solid, the lower limit of the area fraction (S/A) of the hollow-fiber membranes 15 determined by dividing the sum S of sectional areas of the hollow-fiber membranes 15 held by the lower holding member 17 by the area A of the region in which the hollow-fiber membranes 15 are arranged is preferably 20%, and more preferably 25%. The upper limit of the area fraction of the hollow-fiber membranes 15 is preferably 60%, and more preferably 55%. When the area fraction of the hollow-fiber membranes 15 is less than the lower limit, the filtration efficiency per unit volume of the filtration membrane module 2 may become insufficient. On the other hand, when the area fraction of the hollow-fiber membranes 15 is more than the upper limit, the distance between the hollow-fiber membranes 15 is decreased, and it may not be possible to clean the surfaces satisfactorily.

(Upper Holding Member)

The upper holding member 16 is a member that holds the upper ends of a plurality of hollow-fiber membranes 15, communicates with pores of the hollow-fiber membranes 15, and forms a water-collecting header connected to the treated water passage 7. Such a water-collecting header may be formed inside the upper holding member 16, or an upper end portion of the filtration tank 14 may be used as a water-collecting header by dividing the filtration tank 14 with the upper holding member 16. The outer shape of the upper holding member 16 is not particularly limited, and the sectional shape thereof may be polygonal, circular, or the like.

(Lower Holding Member)

The lower holding member 17 is a member that holds the lower ends of a plurality of hollow-fiber membranes 15. The lower holding member 17 includes an outer frame 17a and a plurality of fixing portions 17b that fix the lower ends of the hollow-fiber membranes 15 and seals the lower ends of the hollow-fiber membranes 15. The fixing portions 17b are, for example, bar-shaped and are arranged in parallel or substantially in parallel at certain intervals so that water to be treated and gas bubbles of an inert gas can pass between the fixing portions 17b. A plurality of hollow-fiber membranes 15 are disposed on the upper side of each fixing portion 17b.

Both ends of one hollow-fiber membrane 15 may be fixed with the upper holding member 16 and the lower holding member 17. Alternatively, one hollow-fiber membrane 15 may be bent in a U-shape, two openings may be fixed with the upper holding member 16, and a folded (curved) portion at the lower end may be fixed with the lower holding member 17.

The outer frame 17a is a member for supporting the fixing portions 17b. The length of one side of the outer frame 17a may be, for example, 50 mm or more and 200 mm or less. Furthermore, the sectional shape of the outer frame 17a is not particularly limited and may be polygonal such as rectangular, or circular.

The width (length in the lateral direction) of the fixing portions 17b and the interval between the fixing portions 17b are not particularly limited as long as a sufficient number of hollow-fiber membranes 15 can be fixed, and gas bubbles of the inert gas supplied from the supply passage 4 can pass therethrough. The average width of the fixing portions 17b may be, for example, 3 mm or more and 10 mm or less. The average interval between the fixing portions 17b may be, for example, 1 mm or more and 10 mm or less.

The material of each of the upper holding member 16 and the lower holding member 17 is not particularly limited, and, for example, an epoxy resin, an ABS resin, a silicone resin, or the like may be used.

The method for fixing the hollow-fiber membranes 15 to each of the upper holding member 16 and the lower holding member 17 is not particularly limited, and, for example, a method in which fixing is performed with an adhesive may be employed.

In order to facilitate handling (e.g., transport, installation, and replacement) of the filtration membrane module 2, preferably, the upper holding member 16 and the lower holding member 17 are joined together with a joining member. Examples of the joining member include metal supporting rods and resin casings (outer cylinders).

<Filtered Water Storage Tank>

The filtered water storage tank 3 is a container that stores filtered water filtered by the filtration membrane module 2. The filtered water storage tank 3 may be an airtight container or a container open to the atmosphere. The filtered water storage tank 3 is arranged in order to keep filtered water used as backwash water, which will be described later, and to temporarily store filtered water so that the filtered water quality is checked.

The filtered water storage tank 3 is made of a metal or resin. In particular, from the viewpoint of strength, heat resistance, chemical resistance, and the like, the material for forming the filtered water storage tank 3 is preferably stainless steel, polypropylene, or an acrylonitrile-butadiene-styrene copolymer (ABS resin). The filtered water storage tank 3 may be provided, on the outer side thereof, with a reinforcing member, a leg member for self-support, and the like.

The filtered water storage tank 3 has a capacity sufficient to keep filtered water to be used as backwash water. The flow rate of backwash water is, for example, 2 times or more and 10 times or less the filtration flow rate by volume.

<Supply Passage>

The supply passage 4 is formed mainly of a pipe and connects the water-to-be-treated storage tank 1 to the lower end of the filtration membrane module 2. The supply passage 4 is provided with a supply pump 18 that pumps out water to be treated, an aspirator 19 that produces a negative pressure by means of the Venturi effect due to constriction of a passage of the water to be treated, aspirates an inert gas through the gas transport passage 6, and introduces the inert gas into the water to be treated, and a discharge valve 20 located below the filtration membrane module 2.

(Supply Pump)

The supply pump 18 may be any pump capable of pumping out water to be treated. The discharge pressure of the supply pump 18 is, for example, 10 kPa or more and 1000 kPa or less.

The discharge rate of the supply pump 18, that is, the feed rate of water to be treated to the filtration membrane module 2, is, for example, 20 $L/m^2 \cdot hr$ or more and 1000 $L/m^2 \cdot hr$ or less on the basis of the unit area of a hollow-fiber membrane 15.

(Aspirator)

The aspirator 19 produces a negative pressure by means of the Venturi effect due to constriction of the sectional area of a passage of water to be treated, increases the amount of an inert gas introduced through the gas transport passage 6, which is connected to a gas aspiration port and will be described later, and mixes the inert gas into the water to be treated. Specifically, the aspirator 19 reduces the load of a compressor 21, which will be described later.

The aspirator 19 is preferably configured to shear the aspirated inert gas into very small gas bubbles. For example, a commercially available microbubble generator may be used as an aspirator that generates very small gas bubbles.

The lower limit of the mean diameter of gas bubbles of the inert gas in the filtration membrane module 2 is preferably 1 μm, and more preferably 10 μm. The upper limit of the mean diameter of gas bubbles of the inert gas in the filtration membrane module 2 is preferably 30 mm, more preferably 15 mm, and still more preferably 10 mm. When the mean diameter of gas bubbles of the inert gas in the filtration membrane module 2 is less than the lower limit, a complex structure may become necessary in order to break down the gas bubbles. On the other hand, when the mean diameter of gas bubbles of the inert gas in the filtration membrane module 2 is more than the upper limit, the effect of suppressing clogging of the hollow-fiber membranes 15 by the scrubbing with gas bubbles may be insufficiently provided.

The lower limit of the amount (volume at atmospheric pressure at 20° C.) of inert gas introduced and mixed with water to be treated per unit volume by the aspirator 19 is preferably 0.1 NL/L, and more preferably to 0.5 NL/L. The upper limit of the amount of inert gas introduced is preferably 5 NL/L, and more preferably to 2 NL/L. When the amount of inert gas introduced is less than the lower limit, it may not be possible to sufficiently suppress clogging of the hollow-fiber membranes 15 in the filtration membrane module 2. On the other hand, when the amount of inert gas introduced is more than the upper limit, the amount of filtered water in the filtration membrane module 2 may be limited, or a large capacity is required for the compressor 21, which may unnecessarily increase the equipment cost.

The lower limit of the flow velocity of water to be treated inside the aspirator 19, that is, the flow velocity of water to be treated in a portion of the supply passage 4 connected to the gas transport passage 6 is preferably 2.5 m/s, and more preferably 3 m/s. The upper limit of the flow velocity of water to be treated in a portion of the supply passage 4 connected to the gas transport passage 6 is preferably 15 m/s, and more preferably 10 m/s. When the flow velocity of water to be treated in the portion of the supply passage 4 connected to the gas transport passage 6 is less than the lower limit, the capacity of the compressor 21 necessary for introducing an inert gas may be excessively increased. On the other hand, when the flow velocity of water to be treated in the portion of the supply passage 4 connected to the gas transport passage 6 is more than the upper limit, the capacity of the supply pump 18 may be excessively increased.

The lower limit of the difference in pressure of water to be treated between upstream and downstream of the aspirator 19 is preferably 30%, and more preferably 40% of the discharge pressure of the supply pump 18. The upper limit of the difference in pressure of water to be treated between upstream and downstream of the aspirator 19 is preferably 80%, and more preferably 70% of the discharge pressure of the supply pump 18. When the difference in pressure of water to be treated between upstream and downstream of the aspirator 19 is less than the lower limit, the negative pressure produced by the aspirator 19 may become insufficient. On the other hand, when the difference in pressure of water to be treated between upstream and downstream of the aspirator 19 is more than the upper limit, the water to be treated may be insufficiently supplied to the filtration membrane module 2.

(Discharge Valve)

The discharge valve 20 is opened during backwashing to discharge water to be treated and backwash water in the filtration membrane module 2. Accordingly, the discharge valve 20 is normally closed during filtration.

<Recirculation Passage>

The recirculation passage 5 is formed mainly of a pipe. During steady operation, basically all of the inert gas supplied from the supply passage 4 to the filtration membrane module 2 together with water to be treated is returned through the recirculation passage 5 to the water-to-be-treated storage tank 1 together with water to be treated.

<Gas Transport Passage>

The gas transport passage 6 is formed mainly of a pipe. One end of the gas transport passage 6 is open to the upper space of the water-to-be-treated storage tank 1, and the other end of the gas transport passage 6 is connected to the gas aspiration port of the aspirator 19 of the supply passage 4. Preferably, the one end of the gas transport passage 6 is arranged so as to be open, for example, on the top wall, at a position apart from the liquid surface of the water-to-be-treated storage tank 1 so as not to be splashed with the water to be treated, the water being recirculated through the recirculation passage 5.

In the water treatment system, the gas transport passage 6 is provided with a compressor 21 that pressurizes an inert gas to be introduced into the aspirator 19 of the supply passage 4, and a gas-liquid separator 22 disposed on the discharge side of the compressor 21.

The water treatment system includes a seal water return passage 23 that communicates from the gas-liquid separator 22 to the compressor 21 and recirculates water separated by the gas-liquid separator 22 to the compressor 21. The seal water return passage 23 is provided with a cooling device 24 that cools water separated by the gas-liquid separator 22.

(Compressor)

Any compressor may be used as the compressor 21. In the case where the inert gas can contain droplets of water to be treated, a compressor having resistance to mixing of water is preferably used.

An example of such a compressor having resistance to mixing of water is a water-sealed compressor (water ring pump). The water-sealed compressor has the following structure. An impeller including a plurality of radially arranged blades is eccentrically disposed and rotated in a cylindrical casing that stores seal water, thereby pressing the seal water against the cylindrical wall by the centrifugal force to seal the space between the blades of the impeller with a layer of the seal water. Thus, the volume of the space that is left between the blades of the impeller is changed in accordance with the rotation, to thereby supply, compress, and discharge a gas. In other words, the water-sealed compressor is a pump for suctioning and discharging a gas as a result of the movement of the liquid surface of the seal water in the radial direction between the blades of the impeller. Examples of the water-sealed compressor that can be used include liquid ring pumps "L-Series" available from Elmo Rietschle.

The use of the water-sealed compressor as the compressor 21 prevents a problem such as damage of sealing of the compressor 21 even if the compressor 21 suctions water, because seal water is originally used. Furthermore, even if the compressor 21 suctions water in a large amount, the water is mixed with the seal water, and thus a problem such as overload due to excessive compression of an inert gas in the compressor does not occur.

When a water-sealed compressor is used as the compressor 21, filtered water of the filtration membrane module 2 is preferably used as the seal water. For this purpose, a duct for supplying filtered water from the treated water passage 7 or the backwash water passage 8 to the water-sealed compressor may be provided. Alternatively, at the time of starting the water treatment system, the operator may bring filtered water from the filtered water storage tank 3 by using any container and pour the filtered water in a seal water supply port of the water-sealed compressor. When filtered water of the filtration membrane module 2 is used as seal water of the compressor 21, the seal water can be prepared in the water treatment system, and thus it is not necessary to arrange a pipe or the like for supplying clean water.

The lower limit of the discharge pressure of the compressor 21 is preferably 10 kPa, and more preferably 20 kPa. The upper limit of the discharge pressure of the compressor 21 is preferably 500 kPa, more preferably 200 kPa, and still more preferably 100 kPa. When the discharge pressure of the compressor 21 is less than the lower limit, the amount of inert gas introduced may become insufficient. On the other hand, when the discharge pressure of the compressor 21 is more than the upper limit, the equipment cost and the Operation cost may unnecessarily increase.

(Gas-liquid Separator)

The gas-liquid separator 22 separates and collects seal water that leaks out in the form of a mixture with the inert gas discharged from the compressor 21. A known device that uses, for example, centrifugal separation or inertial impaction may be used as the gas-liquid separator 22.

The seal water separated and collected by the gas-liquid separator 22 is returned to the compressor 21 through the sealing water return passage 23 by the discharge pressure of the compressor 21. This structure ensures that the amount of seal water in the compressor 21 is maintained to stably supply the inert gas.

(Sealing Water Return Passage)

The seal water return passage 23 is connected from a lower portion of the gas-liquid separator 22 to the seal water supply port of the compressor 21.

Since the seal water leaked out from the compressor 21 is collected with the gas-liquid separator 22 and returned to the compressor 21 through the seal water return passage 23, sealing defects due to the shortage of seal water of the compressor 21 can be prevented to reliably introduce the inert gas into water to be treated.

(Cooling Device)

The cooling device 24 includes a heat exchanger that cools seal water separated by the gas-liquid separator 22. Since the seal water to be returned to the compressor 21 is cooled by the cooling device 24, the temperature of the seal water in the compressor 21 can be kept low to prevent a decrease in the capacity of the compressor 21 due to an increase in the temperature.

<Treated Water Passage>

The treated water passage 7 is formed mainly of a pipe and is provided with a suction pump 26 and an on-off valve 25 disposed on the downstream side of the position to which the backwash water passage 8 is connected. One end of the treated water passage 7 is hermetically connected to the filtration membrane module 2, and the other end may be open to the atmosphere inside the filtered water storage tank 3.

(On-Off Valve)

The on-off valve 25 of the treated water passage 7 is normally open during steady operation. However, the on-off valve 25 is closed when the filtration membrane module 2 is backwashed by using the backwash water passage 8, which will be described later, so that filtered water used as backwash water can be prevented from flowing back into the filtered water storage tank 3.

(Suction Pump)

The suction pump 26 suctions, from the water-collecting header in the upper holding member 16 of the filtration membrane module 2, filtered water that has passed from the membrane upstream side to the membrane downstream side of the hollow-fiber membranes 15 and discharges the filtered water to the filtered water storage tank 3 through the treated water passage 7.

By employing this suction filtration method in which filtered water is suctioned from the inside of the hollow-fiber membranes 15 by using the suction pump 26, a change in the amount of filtered water due to the clogged state of the hollow-fiber membranes 15 is decreased, and the water treatment can be performed stably.

The lower limit of the difference in pressure between the inside and the outside of the hollow-fiber membranes 15, the difference being mainly generated by the suction pressure of the suction pump 26, is preferably 5 kPa, and more preferably 10 kPa. The upper limit of the difference in pressure between the inside and the outside of the hollow-fiber membranes 15 is preferably 300 kPa, and more preferably 100 kPa. When the difference in pressure between the inside and the outside of the hollow-fiber membranes 15 is less than the lower limit, a sufficient amount of filtered water may not be obtained. On the other hand, when the difference in pressure between the inside and the outside of the hollow-fiber membranes 15 is more than the upper limit, the hollow-fiber membranes 15 may be damaged.

<Backwash Water Passage>

The backwash water passage 8 is formed mainly of a pipe and is provided with a backwash pump 27 for pressure-feeding the filtered water stored in the filtered water storage tank 3 and an on-off valve 28 disposed on the downstream side (on the treated water passage 7 side) of the backwash pump 27.

(Backwash Pump)

The backwash pump 27 may be any pump capable of pressure-feeding filtered water. The discharge pressure of the backwash pump 27 is, for example, 20 kPa or more and 300 kPa or less.

(On-off Valve)

The on-off valve 28 of the backwash water passage 8 is normally closed during filtration to block the passage so as to prevent filtered water from flowing from the treated water passage 7 into the backwash water passage 8. The on-off valve 28 of the backwash water passage 8 is left opened during backwashing to enable backwash water to be supplied to the filtration membrane module 2.

<Raw Water Passage>

The raw water passage 9 is formed mainly of a pipe. A ball tap 29 is arranged in the raw water passage 9. The ball tap 29 adjusts the flow rate of water to be treated in the raw water passage 9 so as to maintain the height of the liquid level of the water to be treated, the water being stored in the water-to-be-treated storage tank 1, and functions as a liquid level-adjusting mechanism of the water treatment system.

<Water Discharge Passage>

The water discharge passage 10 is formed mainly of a pipe. The filtered water stored in the filtered water storage tank 3 is caused to overflow, thereby keeping the amount of filtered water stored in the filtered water storage tank 3 constant.

<Inert Gas Supply Unit>

The inert gas supply unit 11 includes a gas cylinder 30 that stores a high-pressure inert gas, a supply valve 31, and a gas supply passage 32 that connects between the gas cylinder 30 and the water-to-be-treated storage tank 1.

(Inert Gas)

A gas that has an oxygen volume content of 10% or less, preferably 1% or less, and therefore does not allow inflammables to burn is used as the inert gas supplied by the inert gas supply unit 11. In order to prevent production of oxygen by microorganisms and the like, in the inert gas, the volume content of carbon dioxide having biological activity is more preferably 1% or less. Examples of the main component of such an inert gas include nitrogen and argon. In particular, nitrogen, which is inexpensive, is preferable.

In the inert gas supply unit 11, before the start of operation of the water treatment system, the supply valve 31 is opened to fill the water-to-be-treated storage tank 1 with an inert gas. During steady operation, the supply valve 31 is usually closed. In the water treatment system, when the amount of inert gas filling the system is decreased because the inert gas leaks to the outside or the inert gas is gradually dissolved in water to be treated, the inert gas may be replenished from the inert gas supply unit 11. The decrease in the inert gas in the system may be determined by, for example, sensing the pressure in the water-to-be-treated storage tank 1.

The water treatment system may be provided with an exhaust passage through which air that is present inside the water-to-be-treated storage tank 1, the filtration membrane module 2, the recirculation passage 5, and the like is discharged when filled with the inert gas by the inert gas supply unit 11. When the exhaust passage is provided, air inside the system can be discharged and replaced with the inert gas, and the oxygen concentration can be reduced more reliably to prevent explosions.

<Suspended Matter Discharge Passage>

The suspended matter discharge passage 12 is formed mainly of a pipe and provided with an on-off valve 33. The suspended matter discharge passage 12 is used for discharging suspended matter (for example, a layer of separated oil) near the liquid surface of water to be treated, the water being stored in the water-to-be-treated storage tank 1, by opening the on-off valve 33.

<Sediment Discharge Passage>

The sediment discharge passage 13 is formed mainly of a pipe and provided with an on-off valve 34. The sediment discharge passage 13 is used for discharging sediments (slurry) in water to be treated, the water being stored in the water-to-be-treated storage tank 1, by opening the on-off valve 34.

[Method for Treating Contaminated Water]

A method for treating contaminated water according to an embodiment of the present invention is performed by using the water treatment system illustrated in FIG. 1.

The method for treating contaminated water includes a step of supplying water to be treated from a water-to-be-treated storage tank 1 to a crossflow filtration membrane module 2 (supply step), a step of recirculating the water to be treated, the water having passed through a membrane upstream side of the filtration membrane module 2, to the water-to-be-treated storage tank 1 (recirculation step), and a step of pressurizing an inert gas in an upper space of the water-to-be-treated storage tank 1 by a compressor 21 to introduce the inert gas into an aspirator 19 of a supply passage 4 (introduction step).

<Advantages>

In the water treatment system and the water treatment method using the water treatment system, an upper space of the water-to-be-treated storage tank 1 is hermetically filled with an inert gas, and the inert gas is introduced from the upper space into a supply passage by the compressor 21. As a result, gas bubbles of the inert gas are supplied to the filtration membrane module 2, and clogging of the hollow-fiber membranes 15 can be suppressed by the scrubbing effect of the gas bubbles.

Furthermore, in the water treatment system and the water treatment method, since the space above the liquid surface of water to be treated, the water being stored in the water-to-be-treated storage tank 1, is hermetically filled with the inert gas, gaseous oxygen can be eliminated from the closed system through which the water to be treated is circulated between the water-to-be-treated storage tank 1 and the filtration membrane module 2. Therefore, in the water treatment system, even if flammable gas is generated from the water to be treated, explosions can be prevented by maintaining a low oxygen concentration in the gas.

In the water treatment system, the pressure of the inert gas in the water-to-be-treated storage tank 1 can be maintained by maintaining, with the ball tap 29, the height of the liquid level of the water to be treated, the water being stored in the water-to-be-treated storage tank 1. Accordingly, in the water treatment system, since the amount of inert gas introduced into the supply passage 4 can be kept constant without adding the inert gas, consumption of the inert gas can be reduced.

Since the water treatment system includes the filtered water storage tank 3, the treated water passage 7, and the backwash water passage 8, the filtration membrane module 2 can be backwashed by using, as backwash water, the filtered water stored in the filtered water storage tank 3. Oil and suspended solids adhering to the hollow-fiber membranes 15 are removed and returned to the water-to-be-treated storage tank 1 through the recirculation passage 5 by the backwashing, and the filtration ability of the hollow-fiber membranes 15 can be thereby recovered.

Since the water treatment system includes the inert gas supply unit 11, the inert gas can be easily replenished into the system when the inert gas is dissolved in water to be treated or the inert gas leaks out from the system.

Since the water treatment system includes the suspended matter discharge passage 12 and the sediment discharge passage 13, suspended matter and sediments separated in the water-to-be-treated storage tank 1 from the water to be treated can be appropriately discharged, and it is possible to prevent suspended matter and sediments from being supplied to the filtration membrane module 2.

[Other Embodiments]

It is to be understood that the embodiments disclosed herein are only illustrative and are not restrictive in all respects. The scope of the present invention is not limited to the configurations of the embodiments and is defined by the claims described below. The scope of the present invention is intended to cover all the modifications within the meaning and scope of equivalents of the claims.

In the water treatment system, the inert gas need not be necessarily introduced into the gas transport passage constantly during filtration as long as clogging of the filtration membranes can be reduced. The inert gas may be introduced into the gas transport passage intermittently.

In the water treatment system, since, basically, the amount of inert gas filling the system does not decrease, it is not necessary to supply the inert gas frequently, and the inert gas supply unit may be omitted.

In the water treatment system, the filtered water storage tank may be omitted, and the water treatment system may be configured such that filtered water flowing out from the filtration membrane module is directly discharged into a river or the like. In this case, the water treatment system may be configured such that, for example, city water or the like can be supplied as backwash water.

In the water treatment system, the liquid level-adjusting mechanism of the-water-to-be-treated storage tank may be omitted. In this case, the amount of water to be treated, the water being stored in the water-to-be-treated storage tank, decreases by the amount of filtered water discharged from the filtration membrane module. Therefore, it may be possible to use a batch process in which the treatment is finished when the liquid level of the water-to-be-treated storage tank decreases to a certain height, and the concentrated water to be treated, the water remaining in the water-to-be-treated storage tank, is transferred to other treatment equipment. An example of the other treatment equipment may be an evaporator for further concentrating the water to be treated and disposing of the resulting concentrate as industrial waste.

The liquid level-adjusting mechanism of the-water-to-be-treated storage tank in the water treatment system may be a mechanism other than the ball tap, for example, a combination of a level sensor and a control valve.

In the water treatment system, the suspended matter discharge passage and the sediment discharge passage of the water-to-be-treated storage tank may be omitted.

The filtration membrane module of the water treatment system may include filtration membranes other than the hollow-fiber membranes. Examples of the filtration membranes other than the hollow-fiber membranes include multi-layer flat membranes, pleated membranes, and spiral membranes.

In the filtration membrane module of the water treatment system, the direction in which the hollow-fiber membranes in the filtration membrane module are arranged in parallel, that is, the water-passing direction of water to be treated, may be the lateral direction.

In the water treatment system, filtered water passing from the membrane upstream side to the membrane downstream side of the filtration membranes may be discharged by the pressure of the supply pump without providing the suction pump.

The water treatment system may be configured to perform internal-pressure crossflow filtration in which water to be treated, the water containing gas bubbles of an inert gas, is passed in a pressurized state through the inner side of hollow-fiber membranes, and filtered water that has permeated the hollow-fiber membranes is collected from a filtration layer on the outer side of each of the hollow-fiber membranes.

In the water treatment system, the gas-liquid separator and the seal water return passage may be omitted. The cooling device is not essential also in the case where the water treatment system includes the gas-liquid separator and the seal water return passage.

In the water treatment system, the inert gas may be introduced into the supply passage only by the discharge pressure of the compressor without providing the aspirator.

In the water treatment system, in order to break down gas bubbles of the inert gas, for example, crosspieces or blades may be provided on the downstream side of a portion of the supply passage connected to the gas transport passage or below the filtration membrane module.

In the water treatment system, the gas transport passage may be connected to the filtration tank of the filtration membrane module so that gas bubbles of the inert gas are blown directly into the filtration membrane module.

INDUSTRIAL APPLICABILITY

The present invention can be suitably used for filtering water to be treated, the water containing suspended solids that can generate flammable gas when decomposed, or containing flammable gas dissolved therein in a high concentration, such as oilfield-produced water.

The invention claimed is:

1. A water treatment system comprising a tank that stores water to be treated; a crossflow filtration membrane module that filters the water to be treated; a supply passage through which the water to be treated is supplied from the tank to the filtration membrane module by using a supply pump; and a recirculation passage through which the water to be treated, the water having passed through a membrane upstream side of the filtration membrane module, is recirculated to the tank,
wherein the tank has an upper space above a liquid surface of the stored water to be treated, the upper space being hermetically filled with an inert gas, and
the water treatment system further comprises a gas transport passage through which the inert gas is introduced from the upper space into the supply passage or the filtration membrane module, and
a compressor that is disposed in the gas transport passage and that pressurizes the inert gas.

2. The water treatment system according to claim 1, wherein the compressor is a water-sealed compressor.

3. The water treatment system according to claim 2, further comprising:
a gas-liquid separator on a discharge side of the water-sealed compressor in the gas transport passage; and
a seal water return passage that communicates from the gas-liquid separator to the water-sealed compressor.

4. The water treatment system according to claim 3, comprising a cooling device that is disposed in the seal water return passage and that cools water separated by the gas-liquid separator.

5. The water treatment system according to claim 3, wherein filtered water of the filtration membrane module is used as seal water of the water-sealed compressor.

6. The water treatment system according to claim 1, wherein the inert gas is introduced into the supply passage through the gas transport passage, and a flow velocity of the water to be treated is 2.5 m/s or more and 15.0 m/s or less at a point where the inert gas is introduced into the supply passage.

7. The water treatment system according to claim 1, wherein the gas transport passage is connected to the supply passage, and an aspirator that mixes the inert gas with the water to be treated is disposed at a portion where the gas transport passage is connected to the supply passage.

8. The water treatment system according to claim 1, comprising a suction pump in a passage through which filtered water is discharged from the filtration membrane module.

9. A water treatment method comprising a step of supplying water to be treated, through a supply passage, from a tank that stores the water to be treated to a crossflow filtration membrane module; and a step of recirculating the water to be treated, the water having passed through a membrane upstream side of the filtration membrane module, to the tank,
wherein the tank has an upper space above a liquid surface of the stored water to be treated, the upper space being hermetically filled with an inert gas, and
the water treatment method further comprises a step of pressurizing the inert gas in the upper space by a compressor to introduce the inert gas into the supply passage or the filtration membrane module.

* * * * *